United States Patent
Kwak

(10) Patent No.: US 9,785,142 B2
(45) Date of Patent: Oct. 10, 2017

(54) APPARATUS AND METHOD FOR DATA PROCESSING IN SCADA SYSTEM

(71) Applicant: LSIS CO., LTD., Anyang-si, Gyeonggi-do (KR)

(72) Inventor: Jong Kab Kwak, Yongin-si (KR)

(73) Assignee: LSIS CO., LTD., Anyang-si (KR)

( * ) Notice: Subject to any disclaimer, the term of this patent is extended or adjusted under 35 U.S.C. 154(b) by 955 days.

(21) Appl. No.: 14/037,227

(22) Filed: Sep. 25, 2013

(65) Prior Publication Data

US 2014/0148921 A1 May 29, 2014

(30) Foreign Application Priority Data

Nov. 28, 2012 (KR) ........................ 10-2012-0136508

(51) Int. Cl.
*G05B 15/02* (2006.01)
*G05B 23/02* (2006.01)

(52) U.S. Cl.
CPC ................................ *G05B 23/0267* (2013.01)

(58) Field of Classification Search
CPC .................................................. G05B 23/0267
See application file for complete search history.

(56) References Cited

U.S. PATENT DOCUMENTS 4,688,183 A * 8/1987 Carll ..................... G08B 25/04
340/3.4
6,067,477 A * 5/2000 Wewalaarachchi .. G05B 19/418
700/17

* cited by examiner

*Primary Examiner* — Carlos Ortiz Rodriguez
(74) *Attorney, Agent, or Firm* — Lee, Hong, Degerman, Kang & Waimey

(57) ABSTRACT

The present disclosure relates to an apparatus and method for processing data in a supervisory control apparatus. A data processing method in a supervisory control apparatus according to an embodiment of the present disclosure may include acquiring state data from at least one control and instrumentation target apparatus; checking the acquired state data; reading a prestored library corresponding to the state data; decoding the state data with reference to the read library; and outputting the decoded state data.

5 Claims, 4 Drawing Sheets

| MAIN ITEM | SUB-ITEM | DESCRIPTION |
|---|---|---|
| NAME | | DATA NAME |
| SIZE | | DATA SIZE |
| LOCATION | BYTE | BYTE LOCATION OF RELEVANT STATE DATA |
| | BIT | BIT LOCATION OF RELEVANT STATE DATA |
| VALUE | KEY_VALUE_1(CLASS) | LOCATION OF DATABASE IN WHICH STATE DATA VALUE IS STORED |
| | KEY_VALUE_2(OBJECT) | |
| | KEY_VALUE_3(ATTRIBUTE) | |
| | DATABASE_VALUE | VALUE TO BE STORED IN DATABASE ACCORDING TO STATE DATA VALUE |
| | ALARM | WHETHER OR NOT ALARM OCCURS |
| | ALARM_TYPE | ALARM MESSAGE CODE AND TYPE |
| | ALARM_MESSAGE | ALARM MESSAGE |
| REPETITION | STARTBYTE | START BYTE LOCATION OF STATE DATA TO BE REPETITIVELY PROCESSED |
| | STARTBIT | START BIT LOCATION OF STATE DATA TO BE REPETITIVELY PROCESSED |
| | ENDBYTE | END BYTE LOCATION OF STATE DATA TO BE REPETITIVELY PROCESSED |
| | ENDBIT | END BIT LOCATION OF STATE DATA TO BE REPETITIVELY PROCESSED |
| | NUMBER | REPETITION NUMBER |

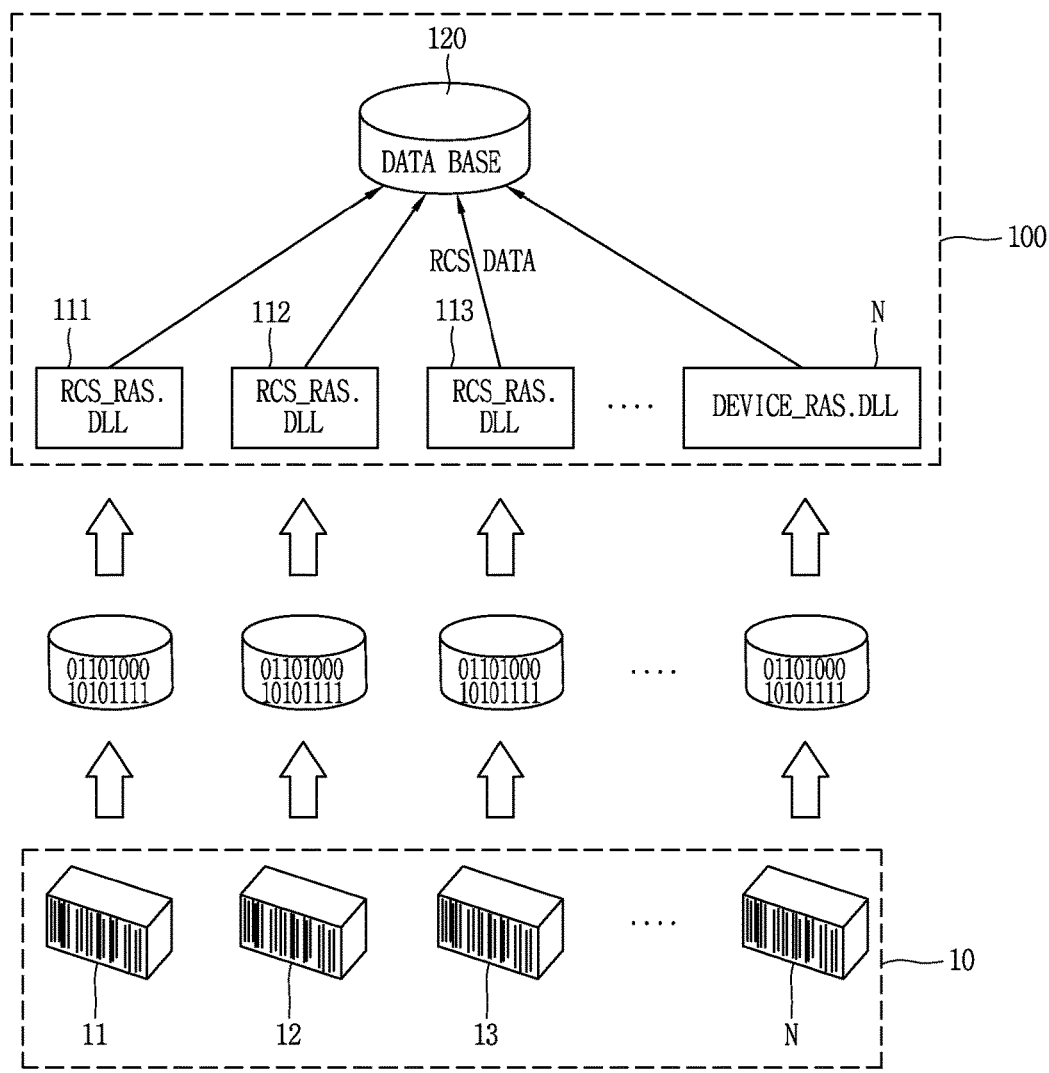

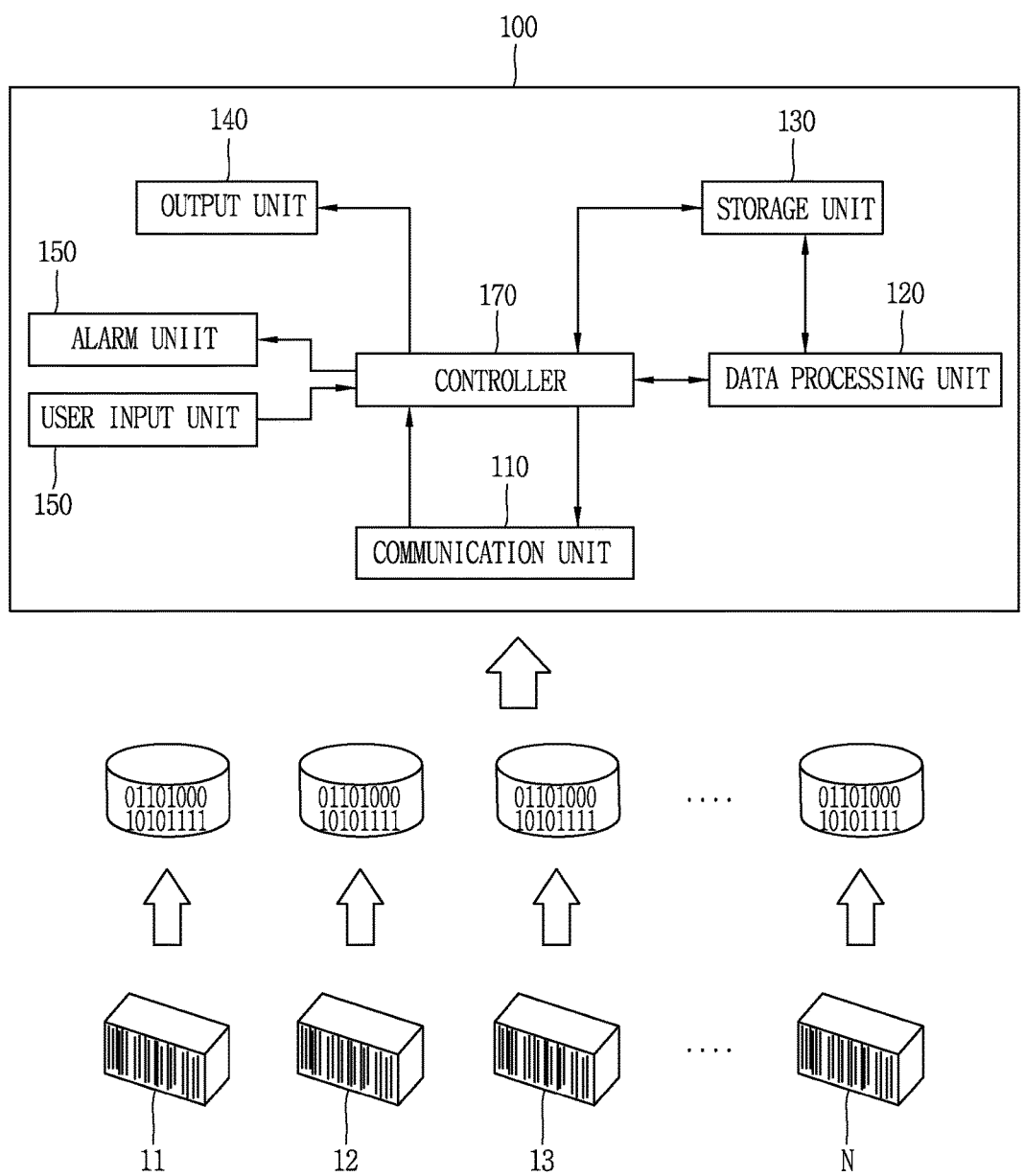

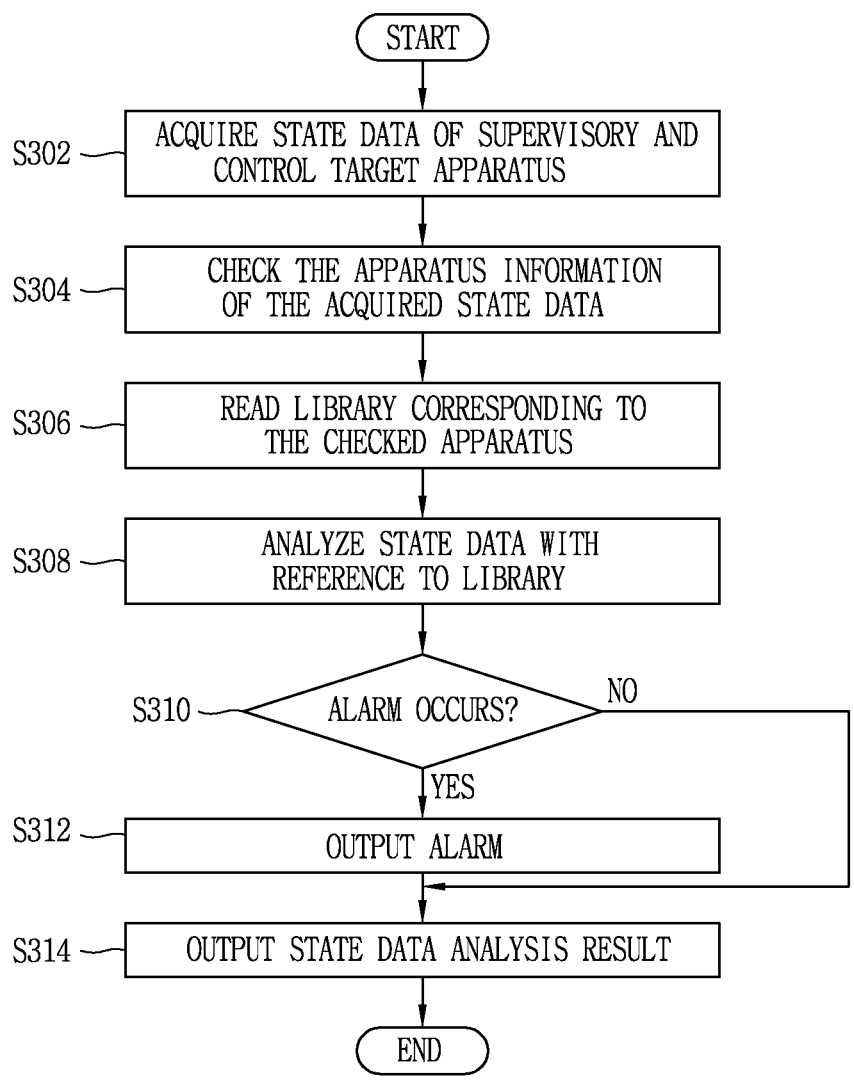

FIG. 4

| MAIN ITEM | SUB-ITEM | DESCRIPTION |
|---|---|---|
| NAME | | DATA NAME |
| SIZE | | DATA SIZE |
| LOCATION | BYTE | BYTE LOCATION OF RELEVANT STATE DATA |
| | BIT | BIT LOCATION OF RELEVANT STATE DATA |
| VALUE | KEY_VALUE_1(CLASS) | LOCATION OF DATABASE IN WHICH STATE DATA VALUE IS STORED |
| | KEY_VALUE_2(OBJECT) | |
| | KEY_VALUE_3(ATTRIBUTE) | |
| | DATABASE_VALUE | VALUE TO BE STORED IN DATABASE ACCORDING TO STATE DATA VALUE |
| | ALARM | WHETHER OR NOT ALARM OCCURS |
| | ALARM_TYPE | ALARM MESSAGE CODE AND TYPE |
| | ALARM_MESSAGE | ALARM MESSAGE |
| REPETITION | STARTBYTE | START BYTE LOCATION OF STATE DATA TO BE REPETITIVELY PROCESSED |
| | STARTBIT | START BIT LOCATION OF STATE DATA TO BE REPETITIVELY PROCESSED |
| | ENDBYTE | END BYTE LOCATION OF STATE DATA TO BE REPETITIVELY PROCESSED |
| | ENDBIT | END BIT LOCATION OF STATE DATA TO BE REPETITIVELY PROCESSED |
| | NUMBER | REPETITION NUMBER | ant
APPARATUS AND METHOD FOR DATA PROCESSING IN SCADA SYSTEM

CROSS-REFERENCE TO RELATED APPLICATIONS

Pursuant to 35 U.S.C. §119(a), this application claims the benefit of earlier date and right of priority to Korean Patent Application No. 10-2012-0136508, filed on Nov. 28, 2012, the contents of which is incorporated by reference herein in its entirety.

BACKGROUND OF THE INVENTION

1. Field of the invention

The present disclosure relates to an apparatus for processing data in a supervisory control apparatus, and a method thereof.

2. Description of the related art

In general, a supervisory control and data acquisition apparatus (hereinafter, referred to as a "supervisory control apparatus") such as supervisory control and data acquisition (SCADA) system may collect all the state data of a facility in real time to guarantee reliability, availability, and serviceability (RAS) for remote supervisory control facilities such as PLC, RCS, RTU, and the like. The supervisory control apparatus analyzes state data sent from a remote supervisory control facility to show the current state of devices to a supervisor or user in real time, thereby guaranteeing RAS functions for the facility.

The supervisory control apparatus may use respective processing units and dedicated analysis tools to process data acquired from various supervisory and control target devices, and reads the acquired data to match the characteristics of the devices.

FIG. 1 is a block diagram illustrating a configuration for data processing in a supervisory control apparatus in the related art.

Referring to FIG. 1, a configuration for data processing in a supervisory control apparatus in the related art may be configured with at least one supervisory and control target apparatus 10 and a supervisory control apparatus 100.

The supervisory control apparatus 100 may include a plurality of data processing units 111 to N for processing the state data of the apparatuses, respectively, received from the at least one supervisory and control target apparatus 11 to N. Furthermore, the supervisory control apparatus 100 may include a database 120 for storing data processed by the plurality of data processing units 111 to N, respectively.

The foregoing apparatuses for data processing may include a configuration for processing the state data of the supervisory and control target apparatuses, respectively, and use an analysis algorithm according to the configuration, and as a result, additional apparatuses and analysis algorithms for data processing may be required when any facility is added thereto or the analysis algorithm is changed.

In other words, according to the related art, analysis structures and modules for state data processing for each supervisory and control target facility may be provided therein, thereby requiring continuous additional configurations for the processing apparatuses and algorithms corresponding to an increase of the data or an increase of the facility.

SUMMARY OF THE INVENTION

An object of the present disclosure is to provide a data processing apparatus and a processing method thereof matched to an increase and change of supervisory and control target apparatuses.

In addition, another object of the present disclosure is to provide an integrated data processing apparatus and a processing method thereof for processing data acquired from a plurality of supervisory and control target apparatuses.

A data processing method according to an embodiment of the present disclosure may include acquiring state data from at least one control and instrumentation target apparatus; checking the acquired state data; reading a prestored library corresponding to the state data; decoding the state data with reference to the read library; and outputting the decoded state data.

Furthermore, a data processing apparatus according to an embodiment of the present disclosure may include a data processing unit configured to acquire state data received from at least one control and instrumentation target apparatus, read a library corresponding to the control and instrumentation target apparatus, and analyze the acquired state data of the control and instrumentation target apparatus based on the library; and a database containing a library for analyzing the state data to correspond to the control and instrumentation target apparatus.

In addition, a library for analyzing state data received from a control and instrumentation target apparatus, the library for data processing in a supervisory control apparatus, may include name information on data configured with at least one code constituting the state data; size information of data configured with the at least one code; byte or bit location information of the state data; address information of a database in which the state data is stored; value information of state data stored in the address; and information of state data to be repeatedly processed.

According to the present disclosure, an apparatus and method for data processing in a supervisory control apparatus may effectively process data without having an additional processing unit even with an increase and change of supervisory and control target apparatuses.

In addition, an apparatus and method for data processing in a supervisory control apparatus according to the present disclosure may manage various supervisory and control target apparatuses in an integrated manner and process data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a configuration for data processing in a supervisory control apparatus in the related art;

FIG. 2 is a block diagram illustrating a data processing system including a supervisory control apparatus to which an embodiment of the present disclosure is applied;

FIG. 3 is a flow chart illustrating a data processing operation according to an embodiment of the present disclosure; and FIG. 4 is an exemplary view illustrating a library structure for data processing according to an embodiment of the present disclosure.

DETAILED DESCRIPTION OF THE INVENTION

Hereinafter, an embodiment of the present disclosure will be described in detail with reference to the accompanying drawings.

FIG. 2 is a block diagram illustrating a data processing system including a supervisory control apparatus to which an embodiment of the present disclosure is applied.

Referring to FIG. 2, a data processing system to which an embodiment of the present disclosure is applied may include at least one supervisory and control target apparatus 11 to N and a supervisory control apparatus 100.

The supervisory control apparatus 100 may include a communication unit 110, a data processing unit 120, a storage unit 130, an output unit 140, an alarm unit 150, a user input unit 160, and a controller 170.

The communication unit 110 may receive state data indicating the state of each apparatus from at least one supervisory and control target apparatus 11 to N. Furthermore, the communication unit 110 may transmit control data corresponding to an apparatus that has transmitted the state data to the relevant apparatus.

The data processing unit 120 may decode the state data of apparatuses received through the communication unit 110 based on a library previously stored in the storage unit 130. The data processing unit 120 may analyze data with no specific structure or format acquired from various supervisory and control target apparatuses 11 to N using the library of the relevant apparatus stored in the storage unit 130. The data processing unit 120 according to an embodiment of the present disclosure may be configured with one integrated data processing unit 120 capable of decoding state data received from a plurality of supervisory and control target apparatuses 11 to N using the library.

The storage unit 130 may store a program for the operation of the controller 170, and store a library for decoding state data received from the supervisory and control target apparatuses 11 to N. The storage unit 130 may store at least one library according to the code and data name corresponding to the supervisory and control target apparatuses 11 to N, and constituting the state data of the supervisory and control target apparatuses 11 to N.

The output unit 140 may be divided into an audio output unit and an image output unit. The audio output unit may output predetermined audio when an alarm occurs according to a state data decoding result. The image output unit may output a decoding result of state data and a monitoring result for the supervisory and control target apparatuses 11 to N. Furthermore, the image output unit may output a predetermined image when an alarm occurs according to the state data decoding result.

The alarm unit 150 may output a signal for notifying an event occurrence according to the result of decoding state data received from the supervisory and control target apparatuses 11 to N by the data processing unit 120. The alarm unit 150 may output an alarm as an audio or video signal according to an alarm output criterion contained in the state data.

The user input unit 160 may receive a user signal that modifies a library for checking the state data of the supervisory and control target apparatuses 11 to N or decoding the state data. The user input unit 160 may be configured with various forms such as a keypad, a dome switch, a touch pad (static pressure/capacitance), a jog wheel, a jog switch and the like.

The controller 170 may typically control an overall operation of the supervisory control apparatus 100. In particular, the controller 170 may check state data received from at least one supervisory and control target apparatus 11 to N through the communication unit 110, and output the processing result decoded by the data processing unit 120 to the output unit 140 and/or the alarm unit 150 or store it in the storage unit 130.

According to the foregoing configuration, an operation for processing data acquired from supervisory and control target apparatuses according to an embodiment of the present disclosure will be described with reference to FIGS. 3 and 4.

FIG. 3 is a flow chart illustrating a data processing operation according to an embodiment of the present disclosure, and FIG. 4 is an exemplary view illustrating a library structure for data processing according to an embodiment of the present disclosure.

Referring to FIGS. 3 and 4, the supervisory control apparatus 100 acquires state data periodically or in real time from at least one supervisory and control target apparatus 11 to N, respectively (S302).

The supervisory control apparatus 100 checks the information of the supervisory and control target apparatus 11 to N that has transmitted the acquired state data (S304). The supervisory control apparatus 100 checks apparatus information on state data, respectively, acquired from a plurality of supervisory and control target apparatuses 11 to N.

The supervisory control apparatus 100 reads a library corresponding to the checked supervisory and control target apparatus (S306). The relevant library may be stored in a storage unit within the supervisory control apparatus 100 or read by reading from an external database (not shown).

When at least one library matched to the information of the checked supervisory and control target apparatus 11 to N is read, the supervisory control apparatus 100 analyzes state data with reference to the library (S308).

A library for reading state data in the supervisory control apparatus 100 may be configured with a format as illustrated in a table in FIG. 4.

A library that can be prestored in the storage unit 130 of the supervisory control apparatus 100 by a user's request may be configured with at least one file format in supervisory and control target apparatuses, respectively, according to the item (name) of a code constituting the state data.

A library may include byte or bit location information including the name of data, the size of the relevant data, and the data divided into a predetermined data size among codes constituting the state data. Furthermore, when a state data value is stored in the storage unit 130, the library may include information on location information in which the state data is stored and a value stored in the relevant location. Besides, information that can be contained in the library may include information on the state alarm condition of the supervisory and control target apparatus according to state information contained in the state data. In other words, when the malfunction or error information of a preset apparatus is contained in the acquired state data or a state value different from the reference value is sensed, the library may include information for generating an alarm or information on the format and message of the alarm. In addition, the library may include information on a repetitive processing for the state data.

As described above, the supervisory control apparatus 100 may read state data received from at least one supervisory and control target apparatus 11 to N with reference to a prestored library, and check whether or not an alarm occurs according to the read result (S310). In other words, when data matched to an alarm occurrence condition is sensed among various state information of the relevant supervisory and control target apparatus contained in the state data, an alarm may be generated according to a preset alarm output condition in the library (S312).

When an alarm is generated or not generated according to whether or not an alarm occurs, the supervisory control apparatus 100 may output an analysis result for state data analyzed by libraries, respectively, through the output unit 140.

The foregoing description has merely described the technical concept of the present disclosure in an exemplary manner, and it will be apparent to those skilled in this art that various changes and modifications may be made thereto without departing from the gist of the present disclosure.

Accordingly, it should be noted that the embodiments disclosed in the present disclosure are only illustrative and not limitative to the technical concept of the present disclosure, and the scope of the technical concept of the present disclosure is not limited by those embodiments.

The scope protected by the present disclosure should be construed by the accompanying claims, and all the technical concept within the equivalent scope of the invention should be construed to be included in the scope of the right of the present disclosure.

What is claimed is:

1. A data processing method in a supervisory control apparatus, the data processing method performed using a data processing apparatus communicatively and commonly connected to a plurality of control and instrumentation target apparatuses, and comprising:
   acquiring state data from each of the plurality of control and instrumentation target apparatuses;
   checking the acquired state data based upon apparatus information on the acquired state data;
   reading a prestored library corresponding to the state data and matching the apparatus information;
   decoding the state data with reference to the read library;
   outputting the decoded state data;
   checking whether or not the decoded state data is contained in a preset alarm output criterion; and
   outputting an alarm for the relevant control and instrumentation target apparatus when the decoded state data is contained in the preset alarm output criterion,
   wherein the output alarm is output according to an alarm output scheme set to the library that has decoded the state data,
   wherein the library is configured with at least one file identified by a data name contained in the state data, and
   wherein the library comprises:
      name information on data configured with at least one code constituting the state data;
      size information of data configured with the at least one code;
      byte or bit location information of the state data;
      address information of a database in which the state data is stored;
      value information of state data stored in the address information;
      information of state data to be repeatedly processed; and
      alarm information configured to check existence or absence of an error regarding the state data, the alarm information including information indicating whether an alarm has occurred and alarm output information.

2. The data processing method of claim 1, wherein the apparatus information that has transmitted the acquired state data is checked to read a library corresponding to the apparatus information when reading the prestored library.

3. A data processing apparatus communicatively and commonly connected to a plurality of control and instrumentation target apparatuses, the data processing apparatus comprising:
   a data processing unit configured to:
      acquire state data received from each of the plurality of control and instrumentation target apparatuses;
      check the acquired state data based upon apparatus information on the acquired state data;
      read a library corresponding to the state data and matching the apparatus information; and
      decode the acquired state data with reference to the read library;
   an output unit configured to output the decoded state data;
   a controller configured to check whether or not the decoded state data is contained in a preset alarm output criterion;
   an alarm unit configured to output an alarm for the relevant control and instrumentation target apparatus when the decoded state data is contained in the preset alarm output criterion,
   wherein the output alarm is output according to an alarm output scheme set to the library that has decoded the state data; and
   a database containing the library,
   wherein the library is configured with at least one file identified by a data name contained in the state data, and
   wherein the library comprises:
      name information on data configured with at least one code constituting the state data;
      size information of data configured with the at least one code;
      byte or bit location information of the state data;
      address information of a database in which the state data is stored;
      value information of state data stored in the address information;
      information of state data to be repeatedly processed; and
      alarm information configured to check existence or absence of an error regarding the state data, the alarm information including information indicating whether an alarm has occurred and alarm output information.

4. The data processing apparatus of claim 3, wherein the library exists as at least one file to correspond to a data item constituting state data received from the control and instrumentation target apparatus.

5. The data processing method of claim 1, wherein the library prestored in a storage unit is modifiable according to a user input received via a user input unit.

* * * * *